US012563617B2

(12) United States Patent
Pandey et al.

(10) Patent No.: US 12,563,617 B2
(45) Date of Patent: Feb. 24, 2026

(54) ELIMINATING EMERGENCY CALL LOSS DUE TO TUNNEL ENDPOINT IDENTIFIER RE-USE IN CELLULAR NETWORKS

(71) Applicant: Cisco Technology, Inc., San Jose, CA (US)

(72) Inventors: Sudeep Kumar Pandey, Acton, MA (US); Sujin Kumar Anagani, Morrisville, NC (US); Rohit Jain, Bothell, WA (US)

(73) Assignee: Cisco Technology, Inc., San Jose, CA (US)

(*) Notice: Subject to any disclaimer, the term of this patent is extended or adjusted under 35 U.S.C. 154(b) by 321 days.

(21) Appl. No.: 18/489,593

(22) Filed: Oct. 18, 2023

(65) Prior Publication Data

US 2025/0133613 A1     Apr. 24, 2025

(51) Int. Cl.
*H04W 76/12* (2018.01)
*H04W 8/18* (2009.01)
*H04W 76/50* (2018.01)

(52) U.S. Cl.
CPC ............ *H04W 76/12* (2018.02); *H04W 8/18* (2013.01); *H04W 76/50* (2018.02)

(58) Field of Classification Search
CPC ....... H04W 76/12; H04W 8/18; H04W 76/50; H04W 76/11
See application file for complete search history.

(56) References Cited

U.S. PATENT DOCUMENTS

| | | | |
|---|---|---|---|
| 2014/0198637 A1* | 7/2014 | Shan ..................... | H04W 72/23 370/229 |
| 2016/0183156 A1* | 6/2016 | Chin ................... | H04L 61/5007 370/331 |
| 2017/0295483 A1 | 10/2017 | Wang et al. | |
| 2019/0182874 A1* | 6/2019 | Cho ................. | H04W 28/0268 |
| 2020/0128460 A1 | 4/2020 | Takakura et al. | |
| 2021/0136658 A1* | 5/2021 | Rönneke ............... | H04W 48/06 |
| 2021/0176817 A1 | 6/2021 | Takakura et al. | |
| 2021/0235267 A1 | 7/2021 | Kim et al. | |
| 2021/0400768 A1 | 12/2021 | Chauhan et al. | |

FOREIGN PATENT DOCUMENTS

| | | | | | |
|---|---|---|---|---|---|
| CN | 111226425 A | * | 6/2020 | ............ | H04W 76/50 |

OTHER PUBLICATIONS

"S-GW Administration Guide, Staros Release 21.28," Cisco, Feb. 2, 2023, pp. 1-420.

* cited by examiner

*Primary Examiner* — Austin J Moreau
(74) *Attorney, Agent, or Firm* — Polsinelli P.C.

(57) ABSTRACT

In one aspect, a method includes receiving, a serving gateway of a core network of a wireless communication system, a call request associated with an emergency service; assigning a Tunnel Endpoint Identifier (TEID) to the call, wherein the TEID has a plurality of bits and a first segment of the plurality of bits are set to identify the TEID as being associated with the emergency service; and establishing the call for the emergency service with a Packet Data Gateway (PGW) of the core network using the TEID, wherein the TEID enables the PGW to suppress deletion of a bearer associated with the call.

20 Claims, 6 Drawing Sheets

RECEIVE A CALL ASSOCIATED WITH AN EMERGENCY SERVICE

400

ASSIGN A TEID TO THE CALL THAT IDENTIFIES THE CALL AS AN EMERGENCY CALL TO BE INCLUDED IN A CALL SESSION REQUEST

402

SEND A CALL SESSION REQUEST TO A PGW FOR ESTABLISHING THE EMERGENCY CALL

404

VERIFY THE CALL AS THE EMERGENCY CALL USING THE SGW-TEID BEFORE DELETING THE CALL

406

ELIMINATING EMERGENCY CALL LOSS DUE TO TUNNEL ENDPOINT IDENTIFIER RE-USE IN CELLULAR NETWORKS

TECHNICAL FIELD

The subject matter of this disclosure relates in general to the field of computer networking, and more particularly, to eliminating deletion of established communication sessions in a wireless communication network due to re-use of tunnel endpoint identifies at various network gateways.

BACKGROUND

Fifth generation (5G) mobile and wireless networks will provide enhanced mobile broadband communications and are intended to deliver a wider range of services and applications as compared to all prior generation mobile and wireless networks. Compared to prior generations of mobile and wireless networks, the 5G architecture is service based, meaning that wherever suitable, architecture elements are defined as network functions that offer their services to other network functions via common framework interfaces. In order to support this wide range of services and network functions across an ever-growing base of user equipment (UE), 5G networks incorporate the network slicing concept utilized in previous generation architectures.

In current 3GPP architecture (e.g., 4G/LTE, 5G, etc.), on a Packet Data Network Gateway (PGW) node, a new call is admitted with the arrival of a Create Session Request (CRS) message from a Serving Gateway (SGW) to the PGW. This message contains the subscriber identity (e.g., International Mobile Subscriber Identity (IMSI), International Mobile Equipment Identity (IMEI), etc.) that identifies the subscriber uniquely in the PGW. The message also comes with a Tunnel Endpoint Identifier (TEID) of the SGW, which the SGW has allocated from a TEID pool.

BRIEF DESCRIPTION OF THE DRAWINGS

Details of one or more aspects of the subject matter described in this disclosure are set forth in the accompanying drawings and the description below. However, the accompanying drawings illustrate only some typical aspects of this disclosure and are therefore not to be considered limiting of its scope. Other features, aspects, and advantages will become apparent from the description, the drawings and the claims.

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Figure 1A:
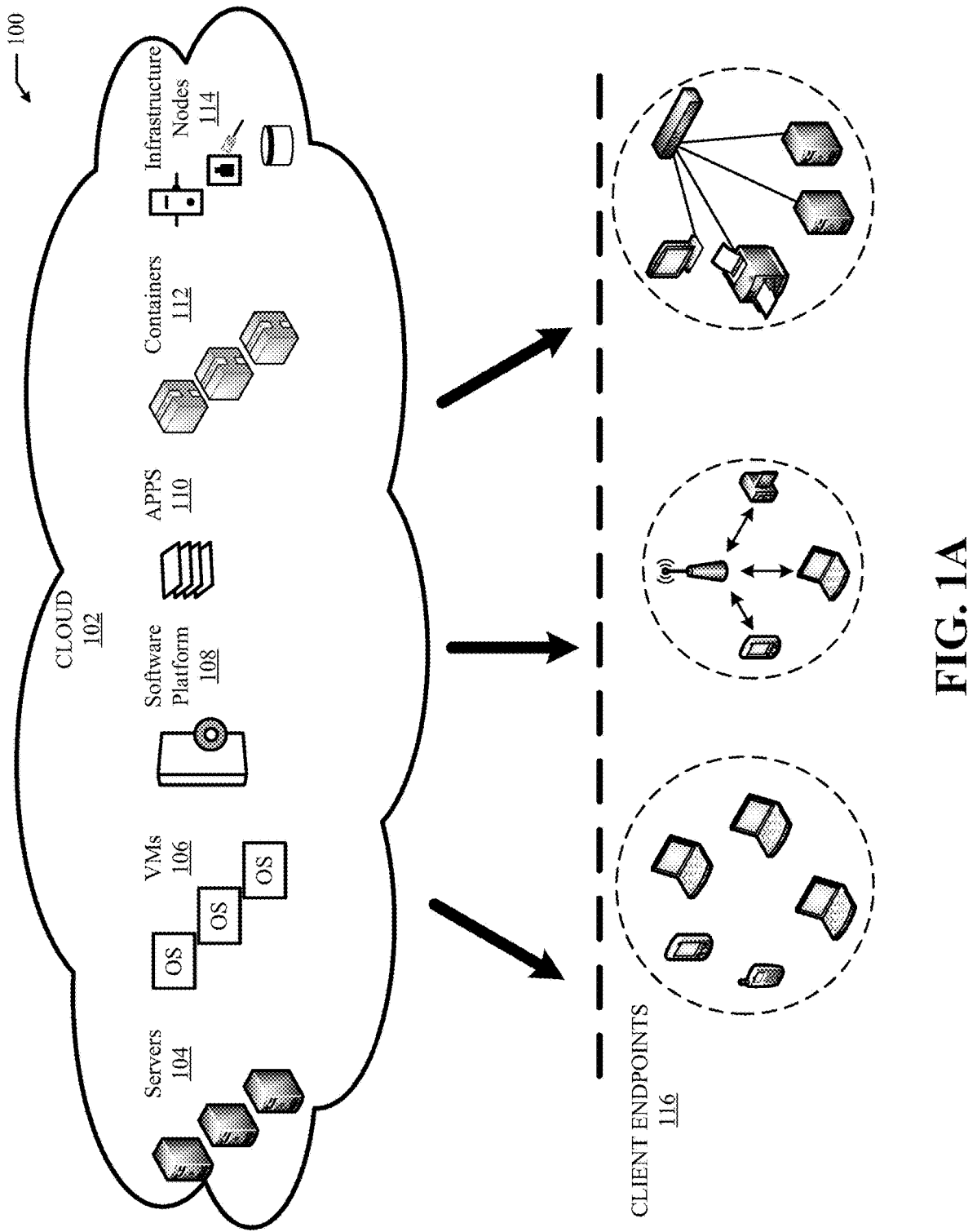
FIG. 1A illustrates an example cloud computing architecture according to some aspects of the present disclosure.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

OVERVIEW

Aspects of the present disclosure are directed to eliminating unwanted drop of emergency calls due to re-use of TEIDs by a SGW of a cellular network when establishing the call with a PGW of the cellular network.

In one aspect, a method includes receiving, a serving gateway of a core network of a wireless communication system, a call request associated with an emergency service; assigning a Tunnel Endpoint Identifier (TEID) to the call, wherein the TEID has a plurality of bits and a first segment of the plurality of bits are set to identify the TEID as being associated with the emergency service; and establishing the call for the emergency service with a Packet Data Gateway (PGW) of the core network using the TEID, wherein the TEID enables the PGW to suppress deletion of a bearer associated with the call.

In another aspect, establishing the call includes generating a Create Session Request, the Create Session Request including the TEID and an International Mobile Subscriber Identify (IMSI) of a device from which the call is received.

In another aspect, the deletion of the bearer associated with the call is triggered upon an expiration of a timer at the PGW for the call.

In another aspect, the PGW checks the TEID to determine if the TEID is associated with the emergency service, and suppresses the deletion of the bearer once PGW confirms that the TEID is associated with the emergency service.

In another aspect, the first segment includes the first 8 bits of the plurality of bits.

In another aspect, the first 8 bits are set to 1.

In one aspect, network device includes one or more memories having computer-readable instructions stored therein and one or more processors. The one or more processors are configured to execute the computer-readable instructions to receive a call request associated with an emergency service; assign a Tunnel Endpoint Identifier (TEID) to the call, wherein the TEID has a plurality of bits and a first segment of the plurality of bits are set to identify the TEID as being associated with the emergency service; and establish the call for the emergency service with a Packet Data Gateway (PGW) at a core network using the TEID, wherein the TEID enables the PGW to suppress deletion of a bearer associated with the call.

In one aspect, one or more non-transitory computer-readable media include computer-readable instructions, which when executed by one or more processors of a serving gateway of a core network of a wireless communication system, cause the serving gateway to receive a call request associated with an emergency service; assign a Tunnel Endpoint Identifier (TEID) to the call, wherein the TEID has a plurality of bits and a first segment of the plurality of bits are set to identify the TEID as being associated with the emergency service; and establish the call for the emergency service with a Packet Data Gateway (PGW) at the core network using the TEID, wherein the TEID enables the PGW to suppress deletion of a bearer associated with the call.

4

EXAMPLE EMBODIMENTS

As noted above, in current 3GPP architecture (e.g., 4G/LTE, 5G, etc.), on a Packet Data Network Gateway (PGW) node, a new call is admitted with the arrival of a Create Session Request (CRS) message from a Serving Gateway (SGW) to the PGW. This message contains the subscriber identity (e.g., International Mobile Subscriber Identity (IMSI), International Mobile Equipment Identity (IMEI), etc.) that identifies the subscriber uniquely in the PGW. The message also comes with a Tunnel Endpoint Identifier (TEID) of the SGW, which the SGW has allocated from a TEID pool. Since this message is supposed to be the first message for this particular subscriber, the SGW typically sets the PGW-TEID to 0.

As will be described below, this new call may be dropped for any number of reason and the assigned TEID may be used by the SGW for a subsequent call including an emergency call. This re-use may result in unwanted drop of the emergency call.

The present disclosure addresses this issue by introducing the use of unique TEIDs for emergency calls whereby a first subset of a plurality of bits of the TEIDs are set to a set number (e.g., 1).

Furthermore, aspects of the present disclosure may be implemented in 3GPP network architectures including, but not limited to, 4G/LTE, 5G cellular networks as well as any further advancements thereof such as 6G.

Example network architectures in which aspects of the present disclosure may be implemented are described with reference to FIGS. 1A-B and FIG. 2. Example signaling for establishing new calls in a 3GPP network architecture will be described with reference to FIG. 3. Aspects of the present disclosure directed to eliminating dropping emergency calls will be described with reference to FIG. 4. The discussion then concludes with a brief description of example devices with reference to FIG. 5.

FIG. 1A illustrates a diagram of an example cloud computing architecture 100. The architecture can include a cloud 102. The cloud 102 can be used to form part of a TCP connection or otherwise be accessed through the TCP connection. Specifically, the cloud 102 can include an initiator or a receiver of a TCP connection and be utilized by the initiator or the receiver to transmit and/or receive data through the TCP connection. The cloud 102 can include one or more private clouds, public clouds, and/or hybrid clouds. Moreover, the cloud 102 can include cloud elements 104-114. The cloud elements 104-114 can include, for example, servers 104, virtual machines (VMs) 106, one or more software platforms 108, applications or services 110, software containers 112, and infrastructure nodes 114. The infrastructure nodes 114 can include various types of nodes, such as compute nodes, storage nodes, network nodes, management systems, etc.

The cloud 102 can be used to provide various cloud computing services via the cloud elements 104-114, such as SaaSs (e.g., collaboration services, email services, enterprise resource planning services, content services, communication services, etc.), infrastructure as a service (IaaS) (e.g., security services, networking services, systems management services, etc.), platform as a service (PaaS) (e.g., web services, streaming services, application development services, etc.), and other types of services such as desktop as a service (DaaS), information technology management as a service (ITaaS), managed software as a service (MSaaS), mobile backend as a service (MBaaS), etc.

The client endpoints 116 can connect with the cloud 102 to obtain one or more specific services from the cloud 102. The client endpoints 116 can communicate with elements 104-114 via one or more public networks (e.g., Internet), private networks, and/or hybrid networks (e.g., virtual private network). The client endpoints 116 can include any device with networking capabilities, such as a laptop computer, a tablet computer, a server, a desktop computer, a smartphone, a network device (e.g., an access point, a router, a switch, etc.), a smart television, a smart car, a sensor, a GPS device, a game system, a smart wearable object (e.g., smartwatch, etc.), a consumer object (e.g., Internet refrigerator, smart lighting system, etc.), a city or transportation system (e.g., traffic control, toll collection system, etc.), an internet of things (IoT) device, a camera, a network printer, a transportation system (e.g., airplane, train, motorcycle, boat, etc.), or any smart or connected object (e.g., smart home, smart building, smart retail, smart glasses, etc.), and so forth.

Figure 1B:
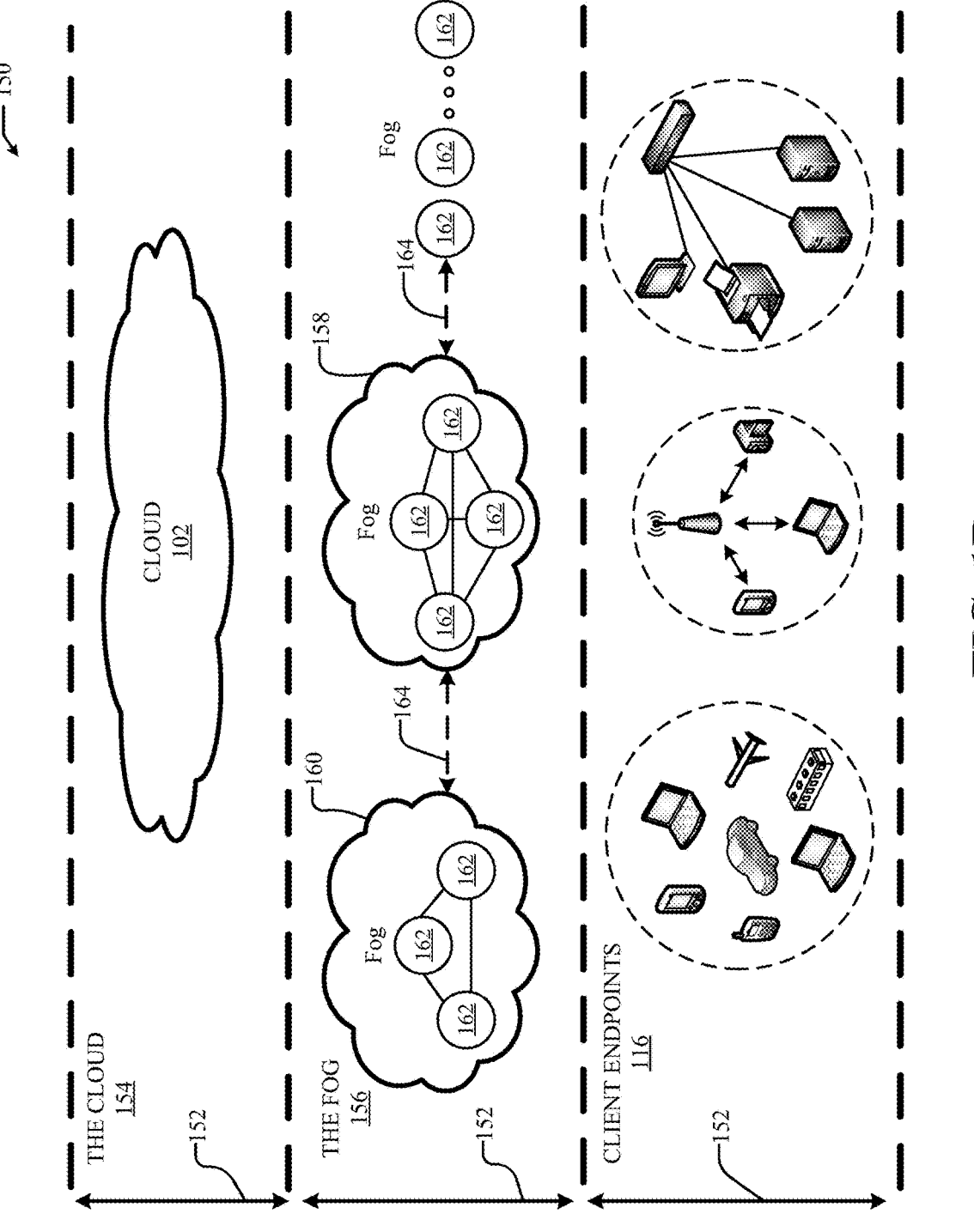
FIG. 1B illustrates an example fog computing architecture according to some aspects of the present disclosure.

FIG. 1B illustrates a diagram of an example fog computing architecture 150. The fog computing architecture can be used to form part of a TCP connection or otherwise be accessed through the TCP connection. Specifically, the fog computing architecture can include an initiator or a receiver of a TCP connection and be utilized by the initiator or the receiver to transmit and/or receive data through the TCP connection. The fog computing architecture 150 can include the cloud layer 154, which includes the cloud 102 and any other cloud system or environment, and the fog layer 156, which includes fog nodes 162. The client endpoints 116 can communicate with the cloud layer 154 and/or the fog layer 156. The architecture 150 can include one or more communication links 152 between the cloud layer 154, the fog layer 156, and the client endpoints 116. Communications can flow up to the cloud layer 154 and/or down to the client endpoints 116.

The fog layer 156 or "the fog" provides the computation, storage and networking capabilities of traditional cloud networks, but closer to the endpoints. The fog can thus extend the cloud 102 to be closer to the client endpoints 116. The fog nodes 162 can be the physical implementation of fog networks. Moreover, the fog nodes 162 can provide local or regional services and/or connectivity to the client endpoints 116. As a result, traffic and/or data can be offloaded from the cloud 102 to the fog layer 156 (e.g., via fog nodes 162). The fog layer 156 can thus provide faster services and/or connectivity to the client endpoints 116, with lower latency, as well as other advantages such as security benefits from keeping the data inside the local or regional network (s).

The fog nodes 162 can include any networked computing devices, such as servers, switches, routers, controllers, cameras, access points, gateways, etc. Moreover, the fog nodes 162 can be deployed anywhere with a network connection, such as a factory floor, a power pole, alongside a railway track, in a vehicle, on an oil rig, in an airport, on an aircraft, in a shopping center, in a hospital, in a park, in a parking garage, in a library, etc.

In some configurations, one or more fog nodes 162 can be deployed within fog instances 158, 160. The fog instances 158, 158 can be local or regional clouds or networks. For example, the fog instances 156, 158 can be a regional cloud or data center, a local area network, a network of fog nodes 162, etc. In some configurations, one or more fog nodes 162 can be deployed within a network, or as standalone or individual nodes, for example. Moreover, one or more of the fog nodes 162 can be interconnected with each other via links 164 in various topologies, including star, ring, mesh or hierarchical arrangements, for example.

In some cases, one or more fog nodes 162 can be mobile fog nodes. The mobile fog nodes can move to different geographic locations, logical locations or networks, and/or fog instances while maintaining connectivity with the cloud layer 154 and/or the endpoints 116. For example, a particular fog node can be placed in a vehicle, such as an aircraft or train, which can travel from one geographic location and/or logical location to a different geographic location and/or logical location. In this example, the particular fog node may connect to a particular physical and/or logical connection point with the cloud 154 while located at the starting location and switch to a different physical and/or logical connection point with the cloud 154 while located at the destination location. The particular fog node can thus move within particular clouds and/or fog instances and, therefore, serve endpoints from different locations at different times.

Figure 2:
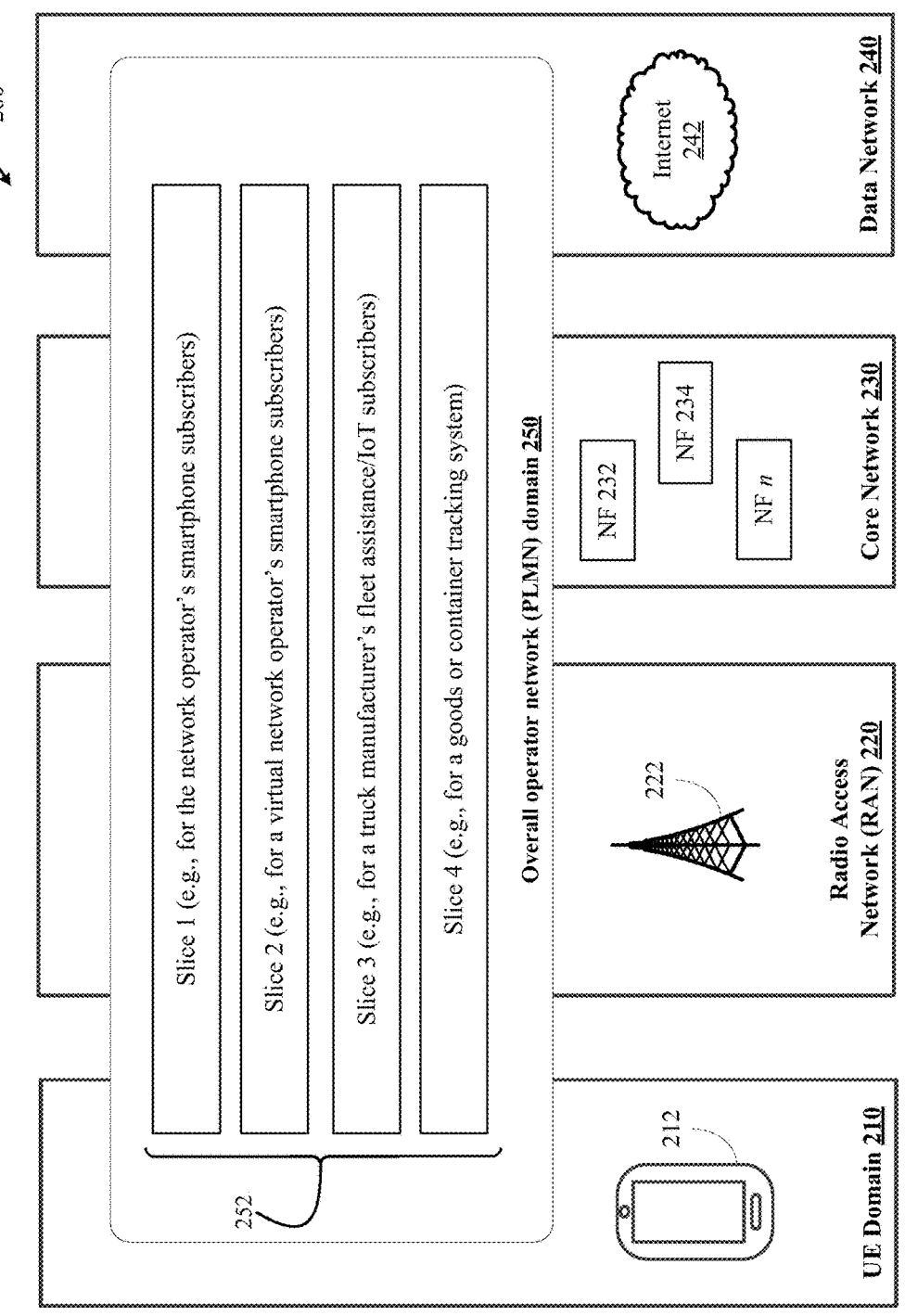
FIG. 2 depicts an exemplary schematic representation of a 5G network environment according to some aspects of the present disclosure.

FIG. 2 depicts an exemplary schematic representation of a 5G network environment 200 in which network slicing has been implemented, and in which one or more aspects of the present disclosure may operate. Non-limiting example 5G network environment 200 can be implemented as part of the example enterprise networks of FIGS. 1A-B. Furthermore, while a 5G network is being described with reference to FIG. 2 as a non-limiting example of a 3GPP network, the present disclosure is not limited thereto. For instance, instead of or in addition to a 5G network, a 4G/LTE network, a 6G network, and/or any other 3GPP-based network may be used.

As illustrated, network environment 200 is divided into four domains, each of which will be explained in greater depth below; a User Equipment (UE) domain 210, e.g. of one or more enterprise, in which a plurality of user cellphones or other connected devices 212 reside; a Radio Access Network (RAN) domain 220, in which a plurality of radio cells, base stations, towers, or other radio infrastructure 222 resides; a Core Network 230, in which a plurality of Network Functions (NFs) 232, 234, . . . , n reside; and a Data Network 240, in which one or more data communication networks such as the Internet 242 reside. Additionally, the Data Network 240 can support SaaS providers configured to provide SaaSs to enterprises, e.g. to users in the UE domain 210.

Core Network 230 contains a plurality of Network Functions (NFs), shown here as NF 232, NF 234 . . . . NF n. In some embodiments, core network 230 is a 5G core network (5GC) in accordance with one or more accepted 5GC architectures or designs. In some embodiments, core network 230 is an Evolved Packet Core (EPC) network, which combines aspects of the 5GC with existing 4G networks. Regardless of the particular design of core network 230, the plurality of NFs typically execute in a control plane of core network 230, providing a service based architecture in which a given NF allows any other authorized NFs to access its services. For example, a Session Management Function (SMF) controls session establishment, modification, release, etc., and in the course of doing so, provides other NFs with access to these constituent SMF services.

In some embodiments, the plurality of NFs of core network 230 can include one or more Access and Mobility Management Functions (AMF; typically used when core network 230 is a 5GC network) and Mobility Management Entities (MME; typically used when core network 230 is an EPC network), collectively referred to herein as an AMF/MME for purposes of simplicity and clarity. In some embodiments, an AMF/MME can be common to or otherwise shared by multiple slices of the plurality of network slices 252, and in some embodiments an AMF/MME can be unique to a single one of the plurality of network slices 252.

The same is true of the remaining NFs of core network 230, which can be shared amongst one or more network slices or provided as a unique instance specific to a single one of the plurality of network slices 252. In addition to NFs comprising an AMF/MME as discussed above, the plurality of NFs of the core network 230 can additionally include one or more of the following: User Plane Functions (UPFs); Policy Control Functions (PCFs); Authentication Server Functions (AUSFs); Unified Data Management functions (UDMs); Application Functions (AFs); Network Exposure Functions (NEFs); NF Repository Functions (NRFs); and Network Slice Selection Functions (NSSFs). Various other NFs can be provided without departing from the scope of the present disclosure, as would be appreciated by one of ordinary skill in the art.

Across these four domains of the 5G network environment 200, an overall operator network domain 250 is defined. The operator network domain 250 is in some embodiments a Public Land Mobile Network (PLMN), and can be thought of as the carrier or business entity that provides cellular service to the end users in UE domain 210. Within the operator network domain 250, a plurality of network slices 252 are created, defined, or otherwise provisioned in order to deliver a desired set of defined features and functionalities, e.g. SaaSs, for a certain use case or corresponding to other requirements or specifications. Note that network slicing for the plurality of network slices 252 is implemented in end-to-end fashion, spanning multiple disparate technical and administrative domains, including management and orchestration planes (not shown). In other words, network slicing is performed from at least the enterprise or subscriber edge at UE domain 210, through the Radio Access Network (RAN) 120, through the 5G access edge and the 5G core network 230, and to the data network 240. Moreover, note that this network slicing may span multiple different 5G providers.

For example, as shown here, the plurality of network slices 252 include Slice 1, which corresponds to smartphone subscribers of the 5G provider who also operates network domain, and Slice 2, which corresponds to smartphone subscribers of a virtual 5G provider leasing capacity from the actual operator of network domain 250. Also shown is Slice 3, which can be provided for a fleet of connected vehicles, and Slice 4, which can be provided for an IoT goods or container tracking system across a factory network or supply chain. Note that these network slices 252 are provided for purposes of illustration, and in accordance with the present disclosure, and the operator network domain 250 can implement any number of network slices as needed, and can implement these network slices for purposes, use cases, or subsets of users and user equipment in addition to those listed above. Specifically, the operator network domain 250 can implement any number of network slices for provisioning SaaSs from SaaS providers to one or more enterprises.

5G mobile and wireless networks will provide enhanced mobile broadband communications and are intended to deliver a wider range of services and applications as compared to all prior generation mobile and wireless networks. Compared to prior generations of mobile and wireless networks, the 5G architecture is service based, meaning that wherever suitable, architecture elements are defined as network functions that offer their services to other network functions via common framework interfaces. In order to support this wide range of services and network functions across an ever-growing base of user equipment (UE), 5G networks incorporate the network slicing concept utilized in previous generation architectures.

Within the scope of the 5G mobile and wireless network architecture, a network slice comprises a set of defined features and functionalities that together form a complete Public Land Mobile Network (PLMN) for providing services to UEs. This network slicing permits for the controlled composition of a PLMN with the specific network functions and provided services that are required for a specific usage scenario. In other words, network slicing enables a 5G network operator to deploy multiple, independent PLMNs where each is customized by instantiating only those features, capabilities and services required to satisfy a given subset of the UEs or a related business customer needs.

In particular, network slicing is expected to play a critical role in 5G networks because of the multitude of use cases and new services 5G is capable of supporting. Network service provisioning through network slices is typically initiated when an enterprise requests network slices when registering with AMF/MME for a 5G network. At the time of registration, the enterprise will typically ask the AMF/MME for characteristics of network slices, such as slice bandwidth, slice latency, processing power, and slice resiliency associated with the network slices. These network slice characteristics can be used in ensuring that assigned network slices are capable of actually provisioning specific services, e.g. based on requirements of the services, to the enterprise.

Associating SaaSs and SaaS providers with network slices used to provide the SaaSs to enterprises can facilitate efficient management of SaaS provisioning to the enterprises. Specifically, it is desirable for an enterprise/subscriber to associate already procured SaaSs and SaaS providers with network slices actually being used to provision the SaaSs to the enterprise. However, associating SaaSs and SaaS providers with network slices is extremely difficult to achieve without federation across enterprises, network service providers, e.g. 5G service providers, and SaaS providers.

While FIG. 2 illustrates a 5G network as an example of a 3GPP network architecture, the present disclosure is not limited thereto and concepts of eliminating drop of emergency calls may be applied in the context of any other 3GPP network architecture such as 4G/LTE as well as future advancements of such network architectures such as upcoming 6G networks and beyond. Furthermore, such networks may be deployed as Stand Alone (SA) or Non-Stand Alone (NSA) networks.

Figure 3:
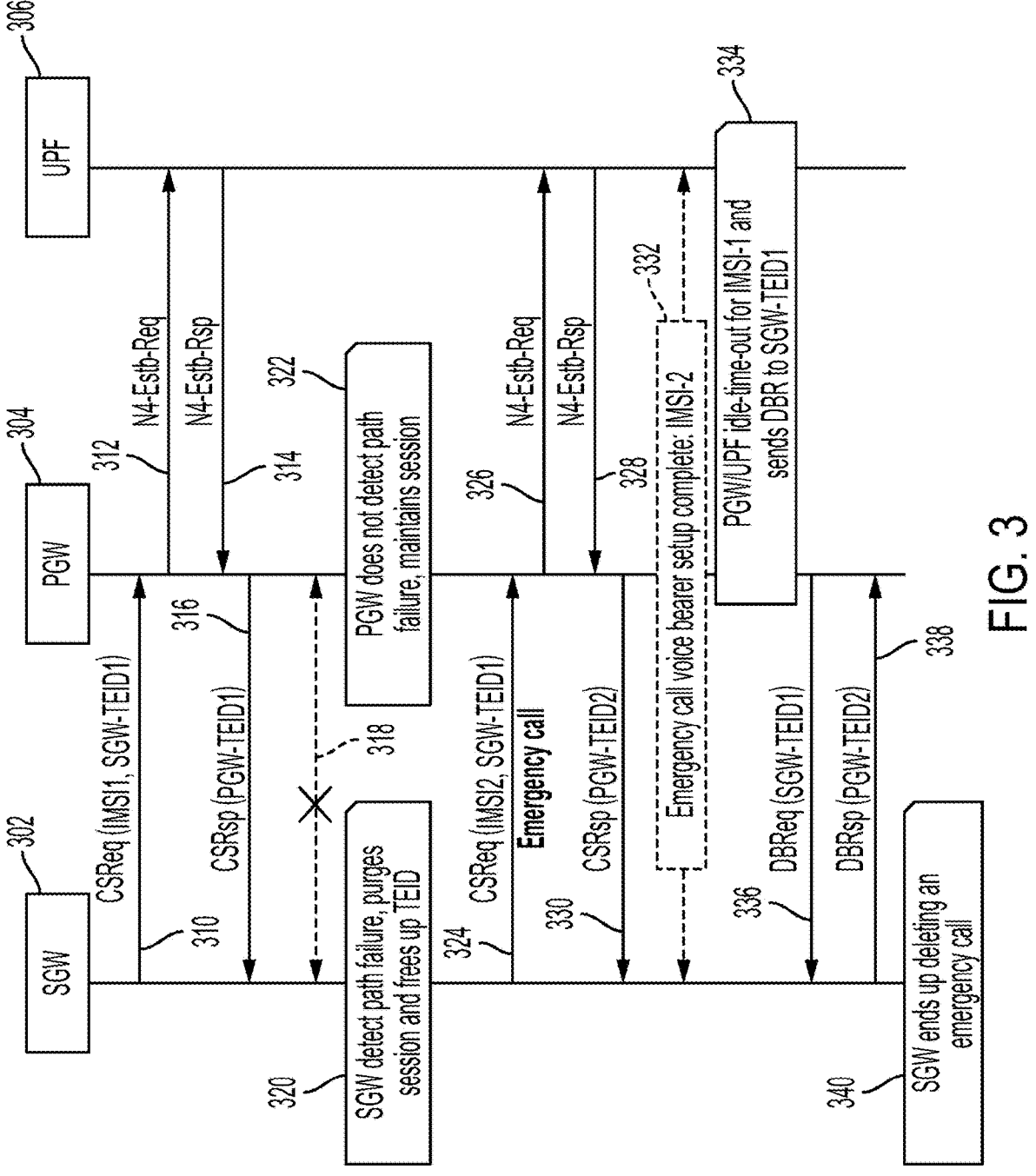
FIG. 3 illustrates a call flow for call establishment in a 3GPP architecture according to some aspects of the present disclosure.

FIG. 3 illustrates a call flow for call establishment in a 3GPP architecture according to some aspects of the present disclosure. FIG. 3 is an example call flow according to which an incoming call may be established in a 4G/LTE and/or 5G cellular system. The call flow can be between a SGW 302, PGW 304, and UPF 306 at a core network of a 5G network.

At step 310, SGW can send a Call Session Request (CRS) for an incoming call to PGW. CRS can include information such as IMSI1 of a device (a first device) from which the incoming call is received. CSR can also include an SGW-TEID assigned to the incoming call by SGW 302 (selected from a pool of TEIDs available to SGW 302).

At step 312, PGW 304 sends an N4-Estb-Request to UPF 306 and may in response receive an N4-Estb-Response back from UPF 306, at step 314. Upon successful processing of the request and establishing a call, at step 316, PGW 304 may send a CSR response (CSRsp) back to SGW 302, which may include PGW 304's own TED (e.g., PGW-TEID1) for the call (PDN connection) for the incoming call from the first device.

At this time, PGW 304 has two TEIDs associated with the call for the first device (i.e., SGW-TEID1 and PGW-TEID1).

At step 318, a path failure (connection failure) may occur between SGW 302 and PGW 304.

At step 320, SGW 302 may detect the path failure and purge (terminate) the establishing session for the call associated with the first device. This purging may include freeing up SGW-TEID1 that SGW 302 assigned to the incoming call for the first device.

At step 322, PGW 304 is unaware of the path failure and maintains the session for the first device. In one example, a timer may be running for this session at PGW 304.

Thereafter, a new incoming call from a second device may be received at SGW 302. This new incoming call may be an emergency call.

At step 324, SGW 302 may send a new CSR message to PGW 304 that includes IMSI2 of device 2 and the same SGW-TEID1 assigned to this new session request for the second device. SGW 302 may re-use SGW-TEID1 since at step 320, SGW 302 purged the earlier session due to path failure and freed up SGW-TEID1 to be reused.

Upon receiving the new request for a session for the second device, PGW 304 may perform steps 326 and 328 in the same manner as steps 312 and 314.

At step 330, upon successful processing of the request and establishing a call, PGW 304 may send a CSR response (CSRsp) back to SGW 302, which may include PGW 304's own new TED (e.g., PGW-TEID2) for the new call (PDN connection) for the incoming call from the second device. PGW 304 may use a new TEID (e.g., PGW-TEID2) for this new call, since from the point of view of PGW 304, the first call for the first device is still active and hence PGW-TEID1 is still in use (since PGW 304 is unaware of the path failure that occurred at step 318).

At this time, PGW 304 has two TEIDs associated with the call for the second device (i.e., SGW-TEID1 and PGW-TEID2).

At step 332, a voice bearer is established and completed for the emergency call coming from IMSI2 (i.e., the second device).

At step 334, the timer mentioned at step 322 may run out (expire). This can result in PGW/UPF idle-time-out for IMSI1. The timer may be monitored between PGW 304 and UPF 306.

In response to the time out, at step 336, PGW 304 may send a Delete Bearer Request (DBR) for SGW-TEID1 to SGW 302.

At step 338, SGW 302 processes the DBR against SGW-TEID1. Since SGW-TEID1 has re-used (reassigned) SGW-TEID1 to the emergency call from device 2, processing the DBR results in the emergency call being deleted, which is not desired.

Aspects of the present disclosure described below with reference to FIG. 4, avoid (eliminate) this unwanted deletion of an emergency call.

Figure 4:
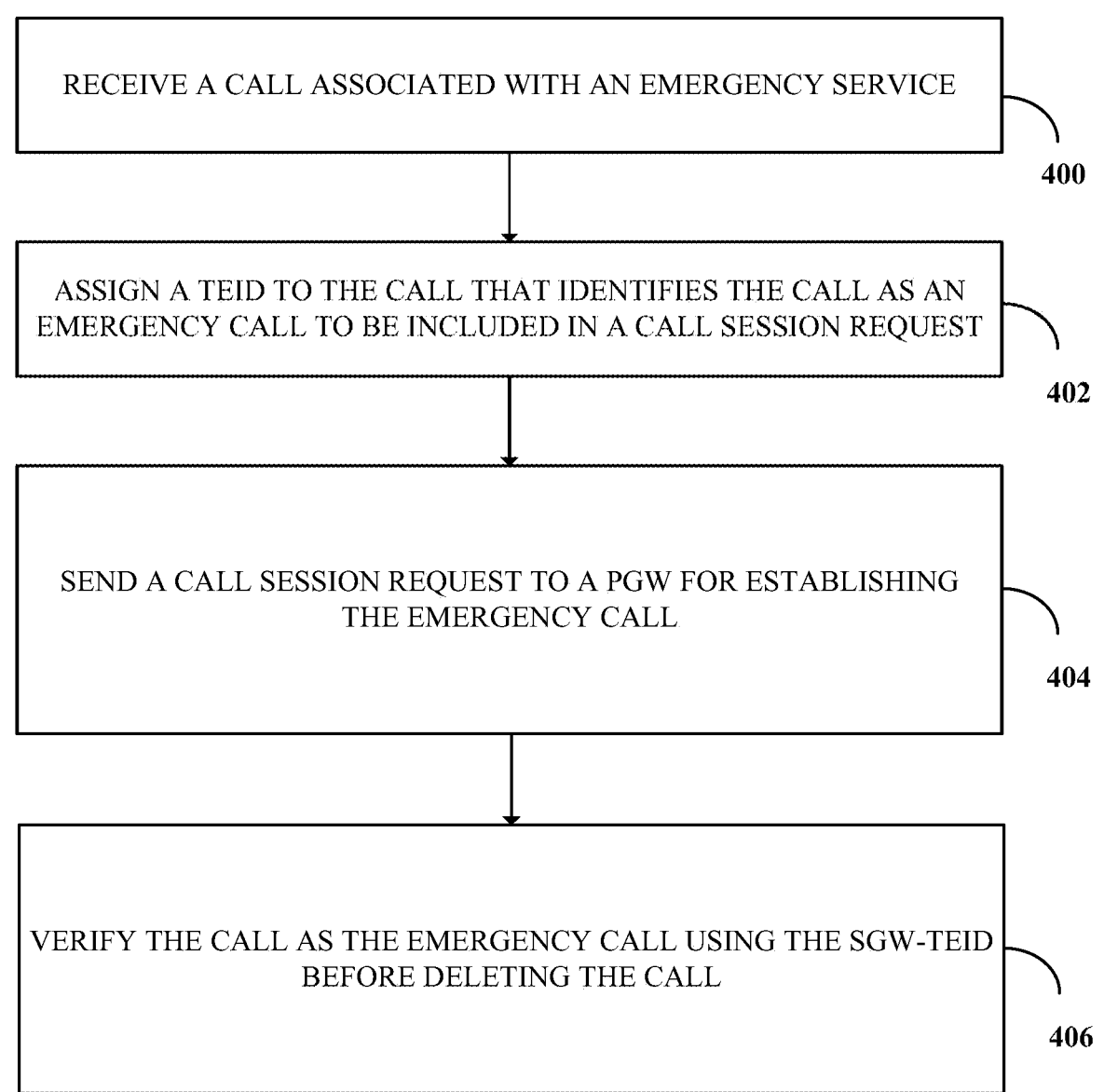
FIG. 4 is an example flow chart of a process for eliminating emergency call loss due to TEID re-use in a cellular network according to some aspects of the present disclosure.

FIG. 4 is an example flow chart of a process for eliminating emergency call loss due to TEID re-use in a cellular network according to some aspects of the present disclosure. Steps of FIG. 4 will now be described from the perspective of SGW 302. It is readily understood by a person having ordinary skill in the art that functionalities of SGW 302 may be performed by a server having one or more memories with computer-readable instructions stored therein. The computer-readable instructions may be executed by one or more processors to perform the steps of FIG. 4.

At step 400, SGW 302 (a serving gateway of a core network of a wireless communication system such as 5G network of FIG. 2), may receive a call request associated with an emergency service. This may be similar to the call received from the second device, as described with reference to FIG. 3. In one example, the emergency nature of the call may be determined based on the IMSI of the device from which the call request is received.

At step 402, SGW 302 may assign a TEID (e.g., SGW-TEID) to the call request that identifies the call an emergency related call. This TEID may be generated for sending a CSR message to PGW 304. The TEID can include a plurality of bits (e.g., 32 bits). In one example, the first 8 bits may be set to 1 for an emergency call request. Accordingly, a TEID used for emergency calls may always start with 0xFF<...>, and this would be known to both SGW 302 and PGW 304.

The number of bits and the value thereof that may be used to designate an emergency call request is not limited to 8 bits and a value '1' and may be set differently based on experiments and/or empirical studies.

At step 404, SGW 302 may send a call session request for establishing the emergency call to PGW 304 using the TEID that identifies the emergency call as assigned at step 402. As noted above, in addition to including a TEID with first set of bits set to identify the emergency call, the call session request also includes the IMSI of the device from which the call request is received at step 400.

With the emergency call established using the TEID identify the emergency nature of the call, at step 406, when the DBR is generated by PGW 304 due to the time-out as discussed with reference to FIG. 3, PGW 304 checks the SGW-TEID assigned to the emergency call and identifies the call that is about to be deleted as an emergency one, and hence avoids deleting the call.

Figure 5:
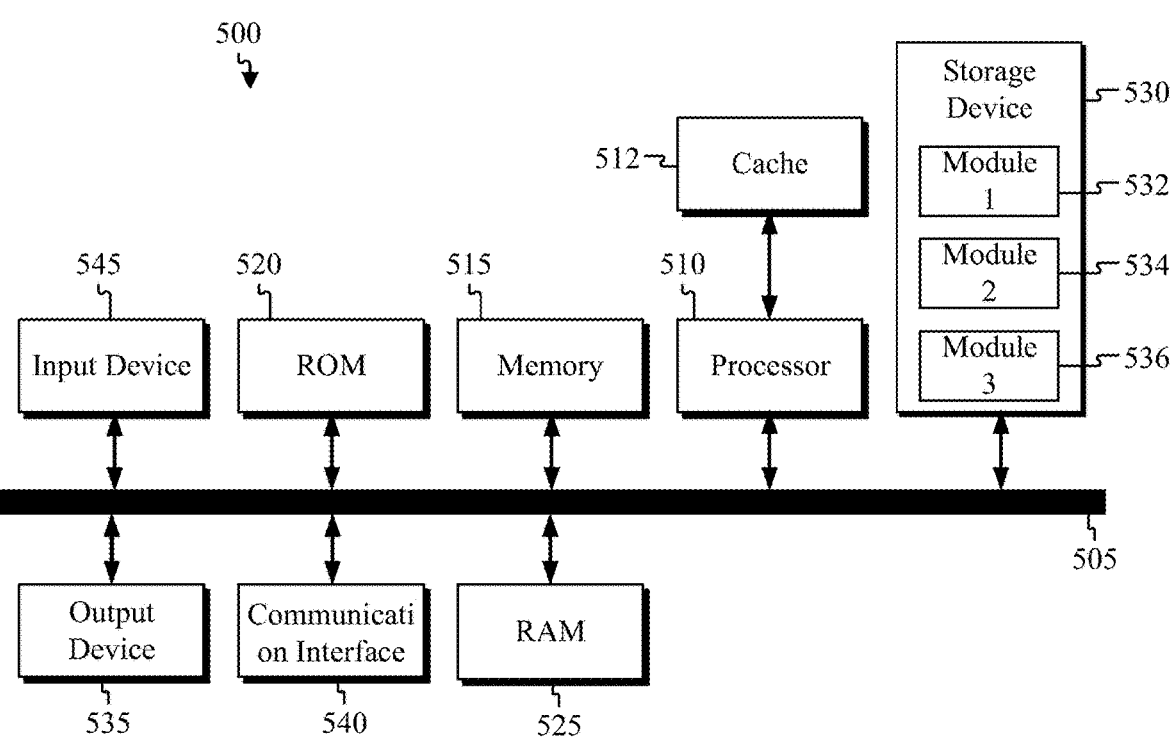
FIG. 5 shows an example of computing system according to some aspects of the present disclosure.

FIG. 5 shows an example of computing system according to some aspects of the present disclosure. Example computing system 500 can be for example any computing device making up enterprise network of FIGS. 1A, 1B, FIG. 2, and/or any of wireless network components described with reference to FIGS. 3 through 6A-B including various gateways, base stations such as eNode-Bs, gNode-Bs, etc., and/or servers that implement core network functionalities such as SMF, AMF, UPF, etc. Various components of system 500 may be in communication with each other using connection 505. Connection 505 can be a physical connection via a bus, or a direct connection into processor 510, such as in a chipset architecture. Connection 505 can also be a virtual connection, networked connection, or logical connection.

In some embodiments computing system 500 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example system 500 includes at least one processing unit (CPU or processor) 510 and connection 505 that couples various system components including system memory 515, read only memory (ROM) 520, and random access memory (RAM) 525 to processor 510. Computing system 500 can include a cache of high-speed memory 512 connected directly with, in close proximity to, or integrated as part of processor 510.

Processor 510 can include any general purpose processor and a hardware service or software service, such as services 532, 534, and 536 stored in storage device 530, configured to control processor 510 as well as a special-purpose processor where software instructions are incorporated into the actual processor design. Processor 510 may essentially be a completely self-contained computing system, containing multiple cores or processors, a bus, memory controller, cache, etc. A multi-core processor may be symmetric or asymmetric.

To enable user interaction, computing system 500 includes an input device 545, which can represent any number of input mechanisms, such as a microphone for speech, a touch-sensitive screen for gesture or graphical input, keyboard, mouse, motion input, speech, etc. Computing system 500 can also include output device 535, which can be one or more of a number of output mechanisms known to those of skill in the art. In some instances, multimodal systems can enable a user to provide multiple types of input/output to communicate with computing system 500. Computing system 500 can include communications interface 540, which can generally govern and manage the user input and system output. There is no restriction on operating on any particular hardware arrangement and therefore the basic features here may easily be substituted for improved hardware or firmware arrangements as they are developed.

Storage device 530 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 530 can include software services, servers, services, etc., that when the code that defines such software is executed by the processor 510, it causes the system to perform a function. In some embodiments, a hardware service that performs a particular function can include the software component stored in a computer-readable medium in connection with the necessary hardware components, such as processor 510, connection 505, output device 535, etc., to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A method comprising:

receiving, a serving gateway of a core network of a wireless communication system, a call request associated with an emergency service;

assigning a Tunnel Endpoint Identifier (TEID) to the call, wherein the TEID has a plurality of bits and a first segment of the plurality of bits are set to identify the TEID as being associated with the emergency service; and establishing the call for the emergency service with a Packet Data Gateway (PGW) of the core network using the TEID, wherein the TEID enables the PGW to suppress deletion of a bearer associated with the call.

2. The method of claim 1, wherein establishing the call comprises:

generating a Create Session Request, the Create Session Request including the TEID and an International Mobile Subscriber Identify (IMSI) of a device from which the call is received.

3. The method of claim 2, wherein the deletion of the bearer associated with the call is triggered upon an expiration of a timer at the PGW for the call.

4. The method of claim 3, wherein the PGW checks the TEID to determine if the TEID is associated with the emergency service, and suppresses the deletion of the bearer once PGW confirms that the TEID is associated with the emergency service.

5. The method of claim 1, wherein the first segment includes the first 8 bits of the plurality of bits.

6. The method of claim 5, wherein the first 8 bits are set to 1.

7. A network device comprising:

one or more memories having computer-readable instructions stored therein; and one or more processors configured to execute the computer-readable instructions to:

receive a call request associated with an emergency service;

assign a Tunnel Endpoint Identifier (TEID) to the call, wherein the TEID has a plurality of bits and a first segment of the plurality of bits are set to identify the TEID as being associated with the emergency service; and establish the call for the emergency service with a Packet Data Gateway (PGW) at a core network using the TEID, wherein the TEID enables the PGW to suppress deletion of a bearer associated with the call.

8. The network device of claim 7, wherein the one or more processors are configured to establish the call by generating a Create Session Request, the Create Session Request including the TEID and an International Mobile Subscriber Identify (IMSI) of a device from which the call is received.

9. The network device of claim 8, wherein the deletion of the bearer associated with the call is triggered upon an expiration of a timer at the PGW for the call.

10. The network device of claim 9, wherein the PGW checks the TEID to determine if the TEID is associated with the emergency service, and suppresses the deletion of the bearer once PGW confirms that the TEID is associated with the emergency service.

11. The network device of claim 7, wherein the first segment includes the first 8 bits of the plurality of bits.

12. The network device of claim 11, wherein the first 8 bits are set to 1.

13. The network device of claim 7, wherein the network device is a serving gateway of a wireless communication system and the wireless communication system is a 5G communication system.

14. One or more non-transitory computer-readable media comprising computer-readable instructions, which when executed by one or more processors of a serving gateway of a core network of a wireless communication system, cause the serving gateway to:

receive a call request associated with an emergency service;

assign a Tunnel Endpoint Identifier (TEID) to the call, wherein the TEID has a plurality of bits and a first segment of the plurality of bits are set to identify the TEID as being associated with the emergency service; and establish the call for the emergency service with a Packet Data Gateway (PGW) at the core network using the TEID, wherein the TEID enables the PGW to suppress deletion of a bearer associated with the call.

15. The one or more non-transitory computer-readable media of claim 14, wherein the execution of the computer-readable instructions by the one or more processors, cause the serving gateway to generate a Create Session Request, the Create Session Request including the TEID and an International Mobile Subscriber Identify (IMSI) of a device from which the call is received.

16. The one or more non-transitory computer-readable media of claim 15, wherein the deletion of the bearer associated with the call is triggered upon an expiration of a timer at the PGW for the call.

17. The one or more non-transitory computer-readable media of claim 16, wherein the PGW checks the TEID to determine if the TEID is associated with the emergency service, and suppresses the deletion of the bearer once PGW confirms that the TEID is associated with the emergency service.

18. The one or more non-transitory computer-readable media of claim 14, wherein the first segment includes the first 8 bits of the plurality of bits.

19. The one or more non-transitory computer-readable media of claim 18, wherein the first 8 bits are set to 1.

20. The one or more non-transitory computer-readable media of claim 14, wherein the wireless communication system is a 5G communication system.

\* \* \* \* \*